(12) United States Patent
Melanson et al.

(10) Patent No.: US 12,533,036 B2
(45) Date of Patent: Jan. 27, 2026

(54) DEVICES AND METHODS FOR MEASURING PORTAL PRESSURE

(71) Applicant: BOSTON SCIENTIFIC SCIMED, INC., Maple Grove, MN (US)

(72) Inventors: Douglas Melanson, Natick, MA (US); Peter L. Dayton, Brookline, MA (US); Laura Elizabeth Christakis, Framingham, MA (US); Sean P. Fleury, Princeton, MA (US); Cory P. Wright, Woodbury, MN (US); George Duval, Sudbury, MA (US); Vanessa Monahan, Natick, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 544 days.

(21) Appl. No.: 17/657,001

(22) Filed: Mar. 29, 2022

(65) Prior Publication Data
US 2022/0218215 A1      Jul. 14, 2022

Related U.S. Application Data

(63) Continuation of application No. 16/548,047, filed on Aug. 22, 2019, now abandoned.
(Continued)

(51) Int. Cl.
*A61B 5/0215* (2006.01)
*A61B 5/00* (2006.01)
(Continued)

(52) U.S. Cl.
CPC ...... *A61B 5/02152* (2013.01); *A61B 5/14503* (2013.01); *A61B 5/6852* (2013.01); *A61B 5/0053* (2013.01); *A61B 5/022* (2013.01)

(58) Field of Classification Search
CPC .......... A61B 5/02152; A61B 5/14503; A61B 5/6852; A61B 5/0053; A61B 5/022
See application file for complete search history.

(56) References Cited

U.S. PATENT DOCUMENTS

| | | | |
|---|---|---|---|
| 4,368,730 A | 1/1983 | Sharrock | |
| 2007/0106165 A1* | 5/2007 | Tulkki | A61B 5/6851 600/561 |

(Continued)

FOREIGN PATENT DOCUMENTS

| | | |
|---|---|---|
| CN | 2061444 U | 9/1990 |
| CN | 201564570 U | 9/2010 |

(Continued)

OTHER PUBLICATIONS

Schulman et al., "EUS-guided portal pressure measurement using a digital pressure wire with real-time remote display: a novel, minimally invasive technique for direct measurement in an animal model." Gastrointestinal Endoscopy, vol. 83, No. 4, 817-820 ( Year: 2016).*

*Primary Examiner* — Daniel L Cerioni
(74) *Attorney, Agent, or Firm* — Fay Kaplun & Marcin, LLP

(57) ABSTRACT

A system for measuring a pressure in a vein includes a needle sized and shaped to be inserted through a working channel of an endoscope. The needle is extending longitudinally and including a channel extending longitudinally therethrough. The system also includes a pressure sensing device including a longitudinally extending body sized and shaped to be slidably inserted through the channel of the needle and a sensor mounted on a distal portion of the body and connected to a proximal portion of the pressure sensing device via a connection cable. The sensor is configured to detect information corresponding to a pressure of a flow of blood through a vein.

17 Claims, 9 Drawing Sheets

Related U.S. Application Data

(60) Provisional application No. 62/728,528, filed on Sep. 7, 2018.

(51) Int. Cl.
*A61B 5/145* (2006.01)
*A61B 5/022* (2006.01)

(56) References Cited

U.S. PATENT DOCUMENTS

| | | | | |
|---|---|---|---|---|
| 2007/0135681 A1* | 6/2007 | Chin | A61M 25/06 | |
| | | | 604/272 | |
| 2008/0086110 A1* | 4/2008 | Galdonik | A61M 25/00 | |
| | | | 604/509 | |
| 2011/0144440 A1* | 6/2011 | Cropper | A61B 17/3421 | |
| | | | 600/203 | |
| 2011/0224575 A1* | 9/2011 | Carrillo, Jr. | A61B 10/0233 | |
| | | | 604/272 | |
| 2013/0006145 A1* | 1/2013 | Toomey | A61B 8/481 | |
| | | | 600/567 | |
| 2016/0067456 A1* | 3/2016 | Burkett | A61B 5/6852 | |
| | | | 600/486 | |
| 2016/0317334 A1* | 11/2016 | Rusk | A61F 2/966 | |
| 2017/0245885 A1 | 8/2017 | Lenker | | |
| 2018/0228553 A1 | 8/2018 | Bai et al. | | |

FOREIGN PATENT DOCUMENTS

| | | |
|---|---|---|
| CN | 202776496 | 3/2013 |
| CN | 103491862 | 1/2014 |
| CN | 103736171 A | 4/2014 |
| CN | 104771208 | 7/2015 |
| CN | 106535773 | 3/2017 |
| CN | 206138176 U | 5/2017 |
| CN | 206995314 | 2/2018 |
| WO | 2007140994 | 12/2007 |
| WO | 2013142386 | 9/2013 |

\* cited by examiner

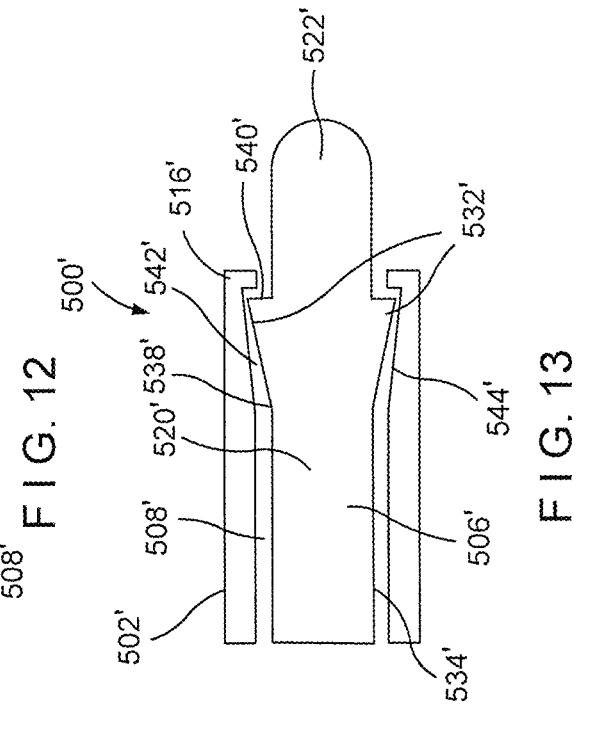
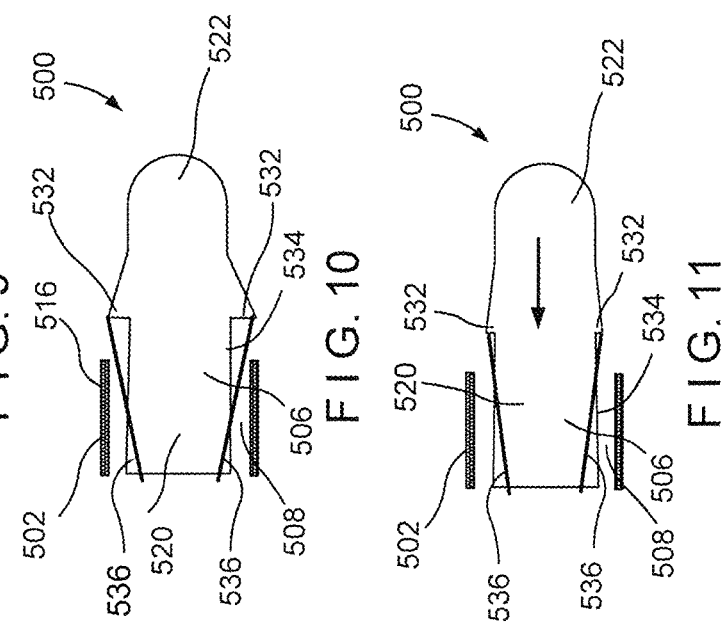
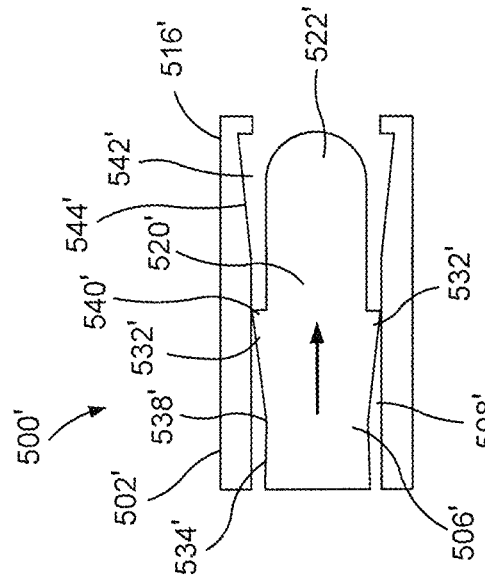
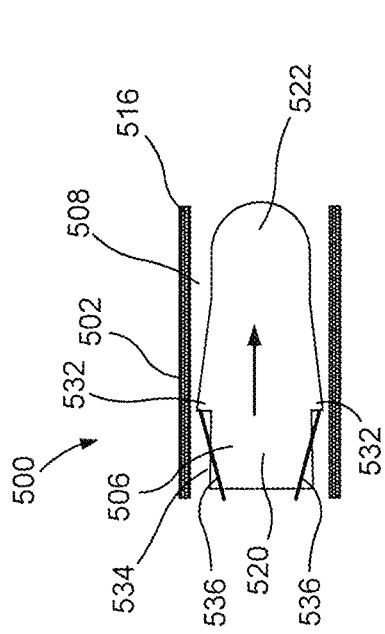

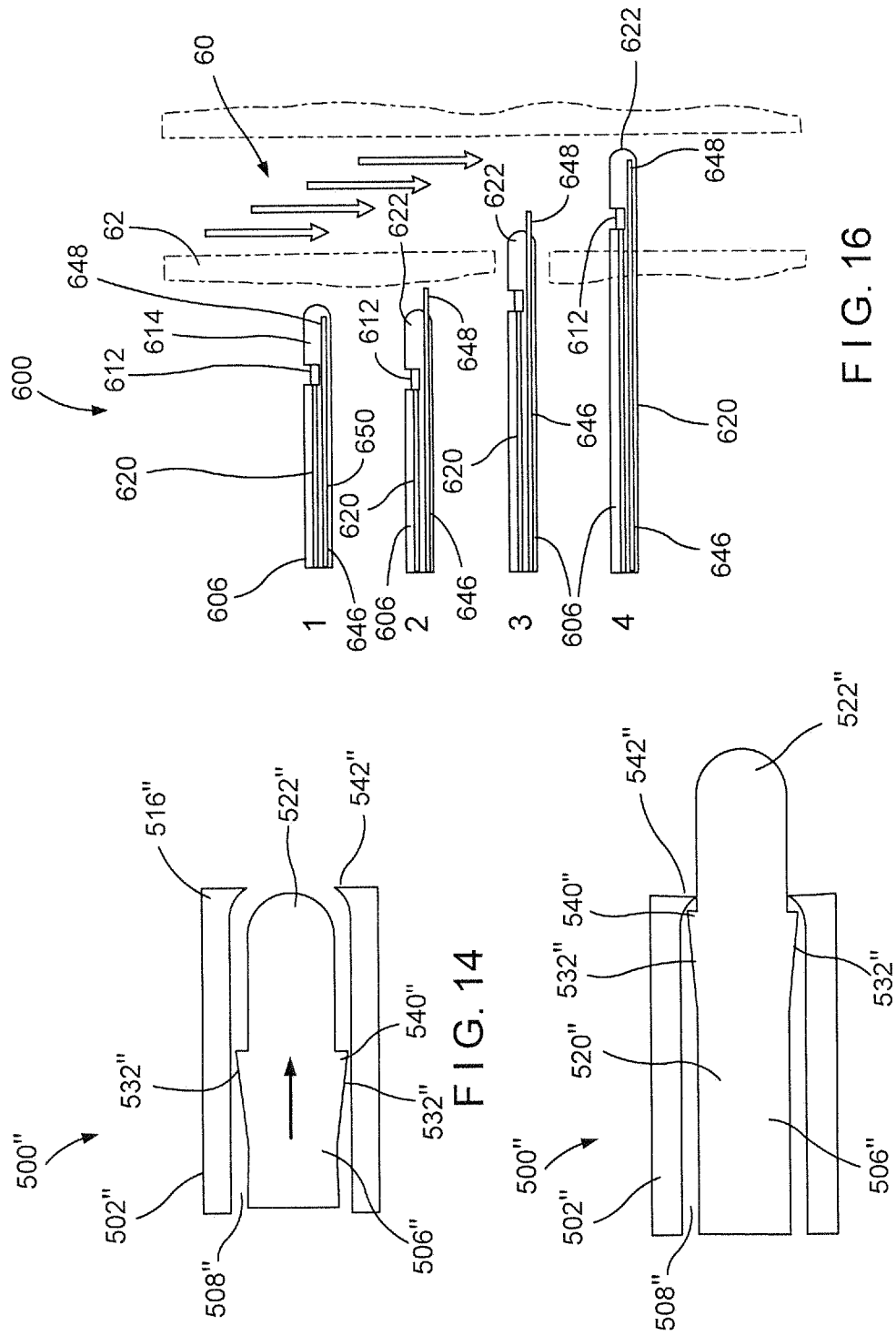

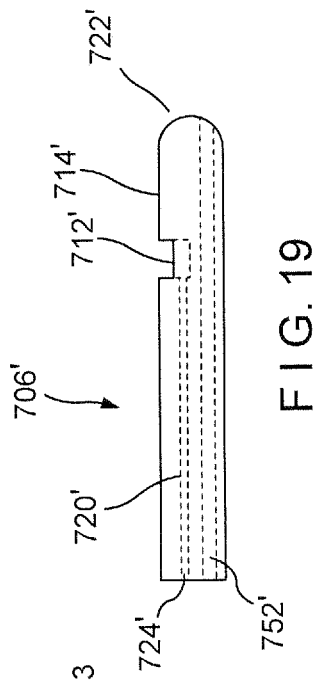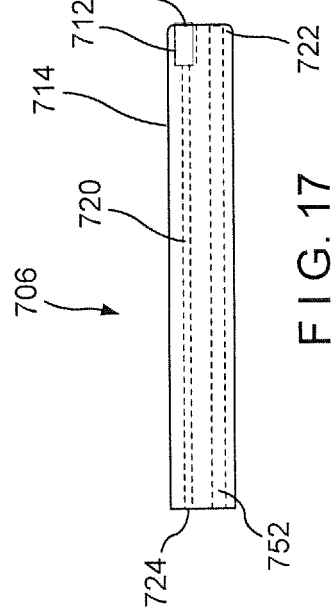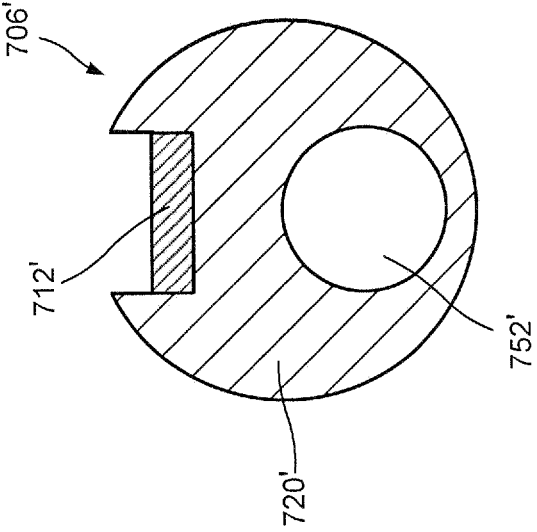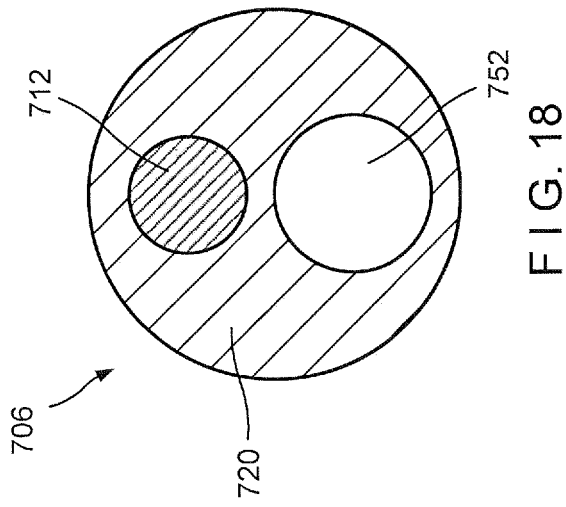

DEVICES AND METHODS FOR MEASURING PORTAL PRESSURE

PRIORITY CLAIM

The present application is a Continuation of U.S. patent application Ser. No. 16/548,047 filed on Aug. 22, 2019, which claims priority to U.S. Provisional Patent Application Ser. No. 62/728,528 filed Sep. 7, 2018; the disclosure of which is incorporated herewith by reference.

BACKGROUND

Portal pressure is used to understand and manage hypertension, for example, in patients with liver cirrhosis. Currently, a measure for portal pressure is extrapolated by calculating a patient's hepatic venous pressure gradient (HVPG). A balloon catheter with sensing capabilities is used to measure a free hepatic venous pressure and a wedged hepatic venous pressure. The HVPG is calculated by taking a difference between the free and wedged hepatic venous pressures. The procedure for placing the balloon catheter, however, is an invasive trans-jugular approach, which provides only an approximated value for the portal pressure.

SUMMARY

The present embodiments are directed to a system for measuring a pressure in a vein, comprising a needle sized and shaped to be inserted through a working channel of an endoscope, the needle extending longitudinally and including a channel extending longitudinally therethrough, and a pressure sensing device including a longitudinally extending body sized and shaped to be slidably inserted through the channel of the needle and a sensor mounted on a distal portion of the body and connected to a proximal portion of the pressure sensing device via a connection cable, the sensor configured to detect information corresponding to a pressure of a flow of blood through a vein.

In an embodiment, the pressure sensing device may be longitudinally movable relative to the needle between an insertion configuration, in which the sensor is covered via a portion of the needle, and a pressure sensing configuration, in which a distal end of the body of the pressure sensing device extends distally past a distal end of the needle to expose the sensor to a flow of fluid within the vein.

In an embodiment, the distal end of the needle may include a sharp tip for piercing a wall of the portal vein and the distal end of the body of the pressure sensing device may include a blunted end so that, in the insertion configuration, the distal end of the body is positioned relative to the sharp tip of the needle to prevent the sharp tip from damaging the working channel of the endoscope.

In an embodiment, the pressure sensing device may be proximally movable relative to the needle so that the sharp tip is exposed to pierce a wall of the vein.

In an embodiment, the distal end of the body of the pressure sensing device may include a sharp tip and the distal end of the needle may be blunted so that, in the insertion configuration, the sharp tip of the pressure sensing device is housed within the channel of the needle, and, in the pressure sensing configuration, the pressure sensing device is moved distally relative the needle, exposing the sharp tip of the body to pierce a wall of the portal vein.

In an embodiment, in the pressure sensing configuration, the distal end of the body may be moved distally past the distal end of the needle via a predetermined distance. The pressure sensing device may include fins coupled to the body so that the fins are movable between a first configuration, in which the fins are constrained toward an exterior surface of the body in the insertion configuration, and a second configuration, in which the fins are moved radially outward to engage a portion of the needle in the pressure sensing configuration.

In an embodiment, the system may further comprise a stylet sized and shaped to be inserted through the channel of the needle, the stylet being longitudinally movable relative to the needle between an insertion configuration and a piercing configuration.

In an embodiment, a distal end of the stylet may include a sharp tip and a distal end of the needle may be blunted so that, in the insertion configuration, the sharp tip of the stylet is housed within the channel of the needle and, in the piercing configuration, the sharp tip of the stylet is moved distally past the distal end of the needle.

In an embodiment, a distal end of the needle may include a sharp tip and a distal end of the stylet may be blunted so that, in the insertion configuration, the distal end of the stylet is positioned relative to the distal end of the needle to prevent the sharp tip of the needle from damaging the working channel of the endoscope and, in the piercing configuration, the stylet is drawn proximally relative to the needle to expose the sharp tip of the needle for piercing a wall of the vein.

In an embodiment, the sensor may be mounted within a recess extending laterally into the body of the pressure sensing device along the distal portion thereof.

In an embodiment, the body of the pressure sensing device may include a through hole extending laterally through the distal portion of the body so that a distal face of the sensor is exposed to a flow of fluid passing through the through hole.

The present embodiments are also directed to a device for measuring a pressure within a vein, comprising a body extending longitudinally from a proximal end to a distal, the body sized and shaped to be inserted through one of a working channel of an endoscope and a channel of an endoscopic needle, and a sensor is positioned on a distal portion of the body, the sensor connected to a proximal portion of the device via a cable connection, the sensor configured to detect information corresponding to a pressure of a flow of blood through a vein.

In an embodiment, the device may further comprise a working channel extending longitudinally through the body.

In an embodiment, the sensor may be movable relative to the body between a first configuration, in which a portion of the sensor occludes a distal opening of the working channel extending through the body, and a second configuration, in which the sensor is moved away from a central axis of the body so that a tool inserted through the working channel of the body has a clear path for insertion into the vein.

In an embodiment, the device may further comprise a cauterizing needle knife slidably housed within the body for creating a hole in a wall of the vein through which the body is insertable to measure the pressure of the vein.

The present embodiments are also directed to a method for measuring a pressure in a vein, comprising inserting a needle through a working channel of an endoscope to a target area proximate a vein and piercing a wall of the vein and inserting a distal portion of a pressure sensing device into the vein to measure a pressure thereof, the pressure sensing device including a sensor mounted on the distal portion and connected to a proximal portion of the device via a connection cable.

BRIEF DISCLOSURE

FIG. 9 shows a longitudinal side view of a distal portion of a system according to another exemplary embodiment of the present disclosure, in a first configuration;

FIG. 10 shows a longitudinal side view of the distal portion of the system of FIG. 9, in a second configuration;

FIG. 11 shows a longitudinal side view of the distal portion of the system of FIG. 9, in a third configuration;

FIG. 12 shows a longitudinal side view of a distal portion a system according to an alternate embodiment of the present disclosure, in a first configuration;

FIG. 13 shows a longitudinal side view of the distal portion of the system of FIG. 12, in a second configuration;

FIG. 14 shows a longitudinal side view of a distal portion of a system according to yet another exemplary embodiment of the present disclosure, in a first configuration;

FIG. 15 shows a longitudinal side view of a distal portion of the system of FIG. 14, in a second configuration;

FIG. 16 shows a schematic view of a system according to another exemplary embodiment of the present disclosure;

FIG. 17 shows a longitudinal side view of a pressure sensing device of the present disclosure according to another exemplary embodiment of the present disclosure;

FIG. 18 shows a cross-sectional view of the pressure sensing device of FIG. 17;

FIG. 19 shows a longitudinal side view a pressure sensing device according to an alternate embodiment;

FIG. 20 shows a cross-sectional view of the pressure sensing device of FIG. 19;

DETAILED DESCRIPTION

Figure 2:
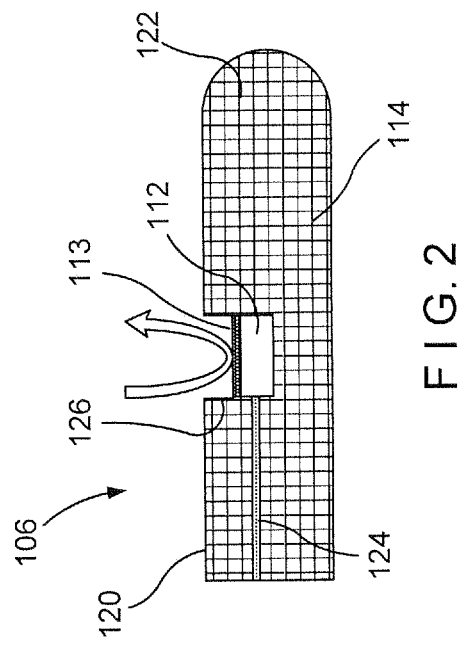
FIG. 2 shows a longitudinal side view of a distal portion of a pressure sensing device of the system of FIG. 1.

The present disclosure may be further understood with reference to the following description and the appended drawings, wherein like elements are referred to with the same reference numerals. The present disclosure relates to systems and methods for measuring a portal pressure and, in particular, describes insertion of a pressure sensing device into the portal vein via a needle that is guided to the portal vein under endoscopic ultrasound guidance. The pressure sensing device is inserted directly into the portal vein to measure the portal pressure. Thus, the present disclosure provides a non-invasive system and method for providing an accurate measurement of the portal pressure. Although the exemplary embodiments specifically show and describe the pressure sensing device as including a sensor for measuring a pressure within the portal vein, the sensor may also measure additional information, in addition to pressure. Thus, it will be understood by those of skill in the art that the below-described systems and methods may also be utilized for obtaining and measuring information other than portal vein pressure. It should be noted that the terms "proximal" and "distal," as used herein, are intended to refer to a direction toward (proximal) and away from (distal) a user of the device.

Figure 1:
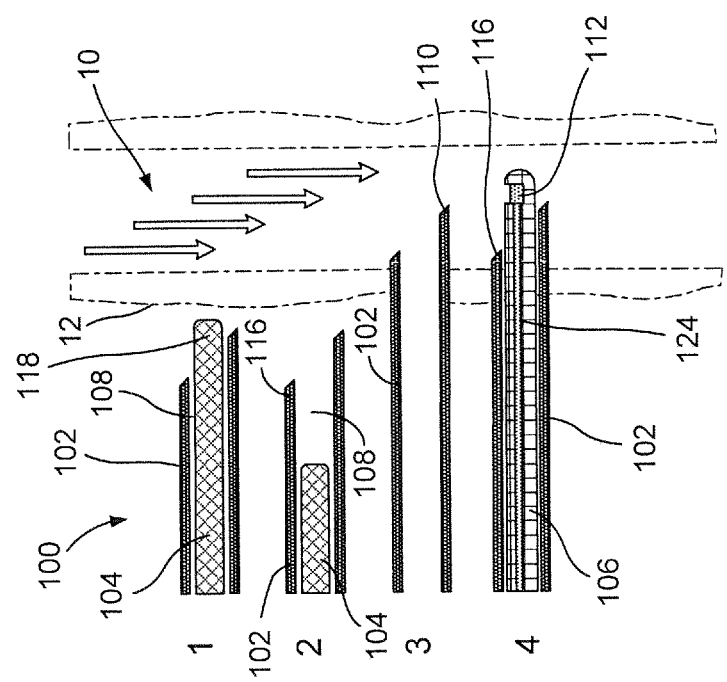
FIG. 1 shows a schematic view of a system according to an exemplary embodiment of the present disclosure.

As shown in FIG. 1, a system 100 for measuring a pressure within a portal vein 10 according to an exemplary embodiment of the present disclosure comprises a needle 102 along with a stylet 104 and a pressure sensing device 106, each of which are passable through a channel 108 of the needle 102. FIG. 1 further shows steps 1-4 for gaining access into the portal vein 10 using the system 100. Initially, the needle 102, with the stylet 104 received within the channel 108 to prevent tissue from entering the channel 108 during insertion, may be passed through a working channel of a flexible endoscope to be positioned proximate a patient's portal vein 10, as shown in step 1. Once the needle 102 has been placed in a desired position proximate to the vein, the stylet 104 may be removed therefrom, as shown in step 2, and a sharp distal tip 110 of the needle 102 may be advanced to puncture a wall 12 of the portal vein 10 so that a distal opening of the needle 102 is positioned within the vein 10, as shown in step 3. Upon gaining access to the portal vein 10, the pressure sensing device 106 is inserted through the channel 108 into the portal vein 10, as shown in step 4, so that a pressure sensor 112 in a distal portion 114 of the pressure sensing device 106 is exposed to the flow of blood through the portal vein 10 to measure the pressure in the vein 10.

The needle 102 extends longitudinally from a proximal end (not shown) to a distal end 116 and includes the channel 108 extending therethrough. The needle 102 is preferably flexible and is sized and shaped to be inserted through a working channel of a flexible endoscope and is particularly configured to be visible under ultrasound guidance so that the needle 102 may be guided to the desired position proximate the portal vein 10. The distal end 116 of the needle 102, in this embodiment, includes the sharp distal tip 110 to facilitate puncturing of the portal vein 10.

The stylet 104 extends longitudinally from a proximal end (not shown) to a distal end 118 and is sized and shaped to be slidable within the channel 108 of the needle 102. The distal end 118 is blunted so that, in an insertion configuration, the stylet 104 is received within the channel of the needle 102 with the blunted distal end 118 aligned with the distal end 116 of the needle 102 or extending slightly distally beyond the distal end 116 of the needle 102 to minimize damage to non-targeted tissue as the tip 110 of the needle 102 is moved to the target site adjacent to the vein 10 (i.e., to prevent the needle 102 from inadvertently piercing or damaging tissue surrounding the path along which the needle is inserted to the target site and to prevent tissue from collecting within the channel 108 during insertion of the needle 102 to the target site.

The pressure sensing device 106, in this embodiment, includes a flexible body 120 and the pressure sensor 112 positioned along a distal portion 114 thereof. Those skilled in the art will understand that the body 120 preferably has a flexibility sufficient to enable the body 120 to be passed through the working channel of a flexible endoscope as the endoscope traverses a tortuous path to the target site adjacent to the vein 10. The body 120 extends from a proximal end (not shown) to a distal end 122 and is sized and shaped to be slidably inserted into the channel 108 of the needle 102. The pressure sensor 112 may be connected to a proximal end of the device 106 via, for example, a connection cable 124 or other data transmission medium extending proximally from the pressure sensor 112 through and along a length of the body 120. The pressure sensor 112 may be an optical sensor or an electrical sensor. As would be understood by those skilled in the art, an optical sensor may require fluid to flow thereacross, which may be analyzed to calculate a corresponding pressure value while an electrical sensor may simply require contact with the blood within the vein to measure a blood pressure thereof. However, those skilled in the art will understand that any sensor capable of measuring the pressure within the vein 10 may be employed and that the sensor may forward data to a data processing arrangement in any known manner including, for example, wireless, optical fiber and wired connections. The pressure sensor 112 may be housed within or mounted along the body 120 in any of a number of configurations as would be understood by those skilled in the art.

Figure 3:
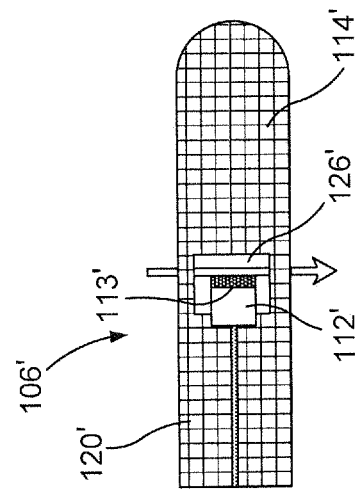
FIG. 3 shows a longitudinal side view of a distal portion of a pressure sensing device according to an alternate embodiment.

In one embodiment, as shown in FIG. 2, the distal portion 114 of the body 120 includes a recess 126 extending laterally thereinto and in which the sensor 112 is positioned. Where the sensor 112 is, for example, a diaphragm-based optical sensor, the sensor 112 may include an angled diaphragm 113 to allow for adequate flow thereacross. This configuration also permits adequate fluid contact where the sensor 112 is an electrical sensor. In another embodiment, as shown in FIG. 3, a distal portion 114' of a body 120' of a pressure sensing device 106' includes a hole 126' extending transversely therethrough so that fluid flows across a distal face 113' of a sensor 112' housed within the distal portion 114' via the hole 126'. The sensor 112', in this embodiment, may be, for example, an optical sensor with a distal-facing diaphragm. This embodiment may be particularly suited for reducing/preventing air bubbles from forming around the pressure sensor 112', which could lead to skewed pressure readings. A positioning ring may be housed within the distal portion 114' to secure the pressure sensor 112' therewithin so that the pressure sensor 112' does not come into contact with any portion of the body 120' which might cause damage thereto during insertion of the pressure sensing device 106' through even tortuous paths of the patient body.

According to an exemplary technique using the system 100, the needle 102, with the stylet 104 received therewithin in the insertion configuration, is inserted through a working channel of an endoscope to a target area proximate a portal vein 10. As would be understood by those skilled in the art, the needle 102 may be guided to the portal vein 10 under, for example, EUS guidance via, for example, the stomach or duodenum. Once the needle 102 is in a desired position proximate the portal vein 10, the stylet 104 may be withdrawn from the channel of the needle 102 so that the sharp distal end of the needle 102 is exposed and the needle 102 may be moved distally to penetrate the portal vein 10. Upon gaining access into the portal vein 10 via the needle 102, the pressure sensing device may then be inserted through channel 108 of the needle 102 until the pressure sensor 112 extends distally beyond the distal end 116 of the needle 102 within the interior of the portal vein 10. The pressure sensor 112 within the portal vein 10 then provides a blood pressure measurement thereof. For example, as described above, a flow of blood within the portal vein 10 along diaphragm of the pressure sensor 112 or contact with fluid with the pressure sensor 112 provides a reading for the pressure measurement. Once the pressure measurement of the portal vein 10 has been obtained, the needle 102 and the pressure sensing device 106 may be removed from the patient body. If desired, the pressure sensing device may optionally be removed from the needle 102 and the stylet 104 may be reinserted to the insertion configuration as the needle 102 is withdrawn proximally back into the endoscope for removal from the body.

Figure 26:
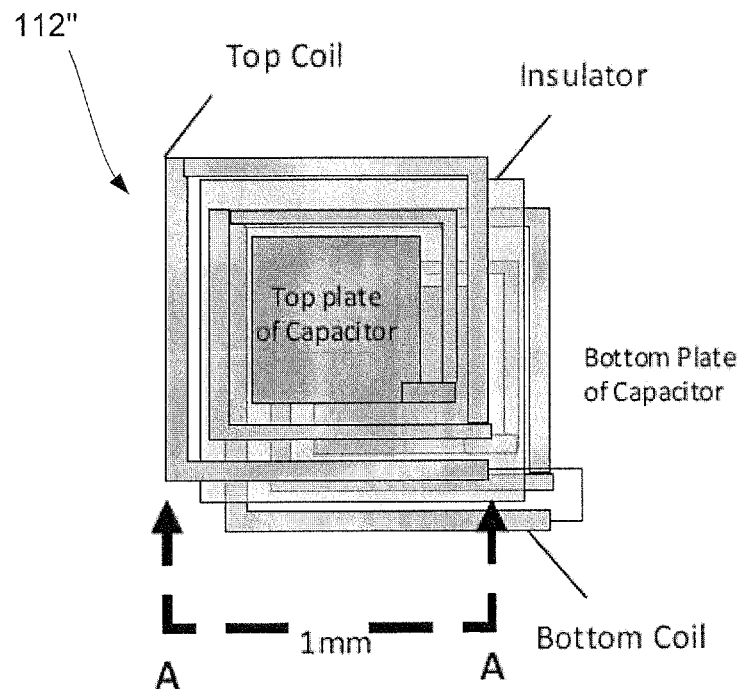
FIG. 26 shows a schematic view of a passive senor according to an exemplary embodiment of the present disclosure.
Figure 27:
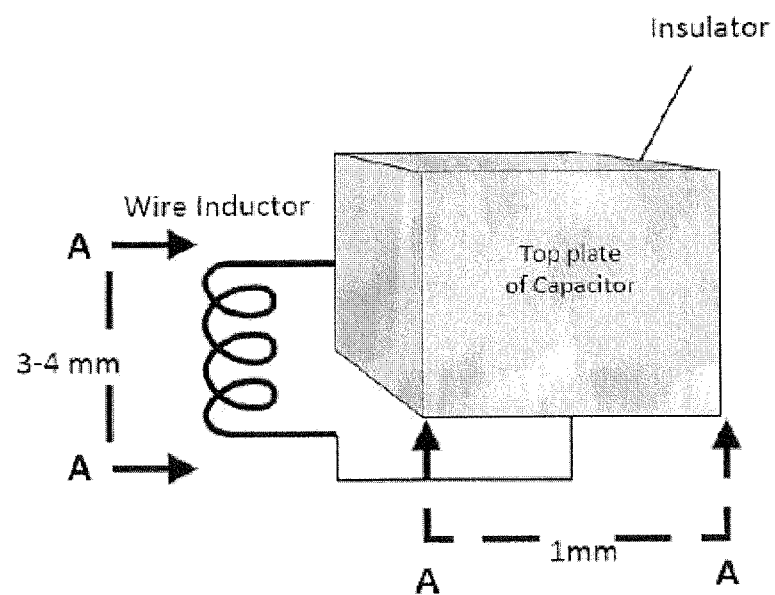
FIG. 27 shows a schematic view of a passive sensor according to another exemplary embodiment of the present disclosure.

Although the system 100 is shown and described as including the pressure sensing device 106 including the pressure sensor 112 along the distal portion 114 of the elongated body 120 thereof so that the pressure sensing device 106 may be immediately removed from the body upon obtaining a pressure measurement, according to another exemplary embodiment, the system 100 may include a pressure sensing device that is deployed within the portal vein 10 to provide periodic monitoring of the portal pressure. In this embodiment, as shown in FIG. 26, a pressure sensing device includes a pressure sensor 112", which may be pushed through the needle 102 and into the portal vein 10 via, for example, the stylet 104 or any other delivery device. The pressure sensor 112" may be a wireless passive sensor including a resonant tank circuit of a parallel inductor and capacitor. In one embodiment, as shown in FIG. 26, the passive sensor may be formed in a 1 mm by 1 mm form using micro-machined traces for two parallel inductors sandwiching an insulating substrate. The parallel inductive traces can be used to create a parallel plate capacitance for the sensor. The passive sensor may be anchored within the portal vein 10 via, for example, a nitinol anchor wire which may act as an inductor or a part of an inductor of the resonant tank circuit sensor. In another embodiment, as shown in FIG. 27, a capacitor may be micromachined on a polymer substrate which is attached to a loop wire.

In one embodiment, the inductive wire or coil may be trace engineered to be several 10s of nH's. In one particular example, the inductance may be 47 nH. The capacitance should be as large as possible to ensure a lower resonant frequency given the physical constraints and, in one example, may have a minimal value of 1 pF. In one embodiment, the polymer substrate, which acts as an insulator, may be formed of a polymer that will give under pressure while maintaining a relative permittivity of greater than 4. According to one example, the polymer substrate may have a thickness of 10 μm. In one embodiment, a high Q (quality factor) is desired and may be achieved by increasing the turns and splitting the coil evenly from the top and bottom layers, keeping the ratio of the L/C high. In one embodiment, a resonant frequency should be low enough to allow coupling from outside of the body (e.g., below 1 GHz) and keeping the form factor small enough so as not to interfere with the blood flow. In one embodiment, the resonant frequency may range from between 800 MHz to 1000 MHz.

According to one example, a polymer made of flexible laminate may allow for a dielectric constant (e.g., 9 or 10) which allows for a high Q and smaller dimensions of the passive resonant circuit. A nitinol wire, which may be used to anchor the passive sensor, may allow more flexibility of the anchor. Controlling a length of the anchoring wire would allow for an inductor ranging in value from between 33-47 nH so that a parallel plate capacitor sensor on the end may be valued from between 0.8 pF to 1.2 pF in the space constraints of a disc having a size of 1 mm or smaller to resonate within a range of 800 MHz to 1000 MHz.

The passive sensor 112" may be read, for example, by using a near field communication device that can be tuned to the resonant frequency of the passive circuit as it is deployed from the body. The resonant frequency will shift according to the change in pressure so that extrapolating the pressure is achieved from tracking the change in pressure deployed in the system versus its neutral state before being introduced into the system. In one embodiment, a near field communication device may be utilized via a smart phone. A device including a variation of a loop antenna multiplexed from transmit to receive with a voltage controlled oscillator and receiver will be attached to a smart phone and controlled by an application run on the phone. The application will detect peak output from the passive sensor and read the frequency setting while at peak. There will be a linear correlation to frequency and pressure when the passive sensor is fabricated. A calibration of the baseline frequency and sensitivity will be created during initial testing to be used in the application of the smart phone. A reading may be taken off the body by placing the smart phone near the target area until, for example, an optimal signal strength is indicated on the phone. Periodic readings of the frequency may be acquired to monitor changes in pressure.

Figure 4:
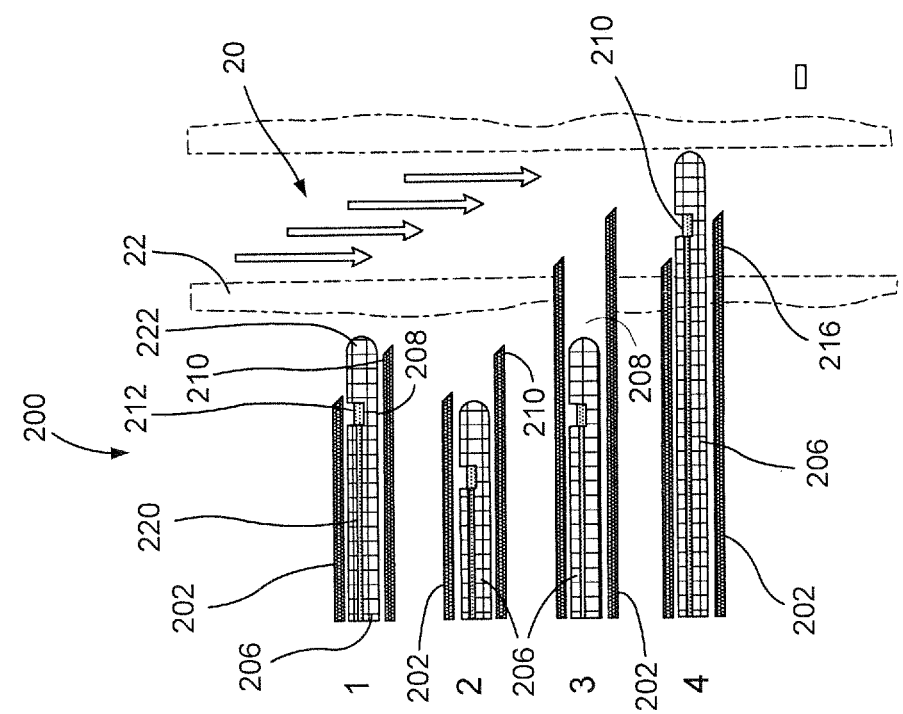
FIG. 4 shows a schematic view of a system according to another exemplary embodiment of the present disclosure.

As shown in FIG. 4, a system 200 according to another exemplary embodiment of the present disclosure is substantially similar to the system 100 described above, comprising a needle 202 and a pressure sensing device 206. The system 200, however, does not require a stylet, as shown in steps 1-4 of FIG. 4, to gain access to the interior of a portal vein 20. Rather, the pressure sensing device 206, which includes a blunt distal end 222, is received within a channel 208 of the needle 202 during insertion of the needle 202 through a working channel of an endoscope to a target area proximate a portal vein 20. Similarly to the stylet 104 of the system 100, the pressure sensing device 206 of this embodiment is positioned within the channel 208 of the needle 202 so that the blunt distal end 222 of the pressure sensing device 206 prevents tissue from entering the channel 208 and/or prevents the sharp tip 210 of the needle 202 from damaging the working channel of the endoscope during insertion of the needle 202 therethrough and also prevents harm to non-targeted tissue as the needle 202 is extended distally from the endoscope.

The needle 202 and the pressure sensing device 206 are substantially similar to the needle 102 and pressure sensing device 106 of the system 100. As described above, the pressure sensing device 206 includes a blunt distal end 222 and prevents the sharp distal tip 210 of the needle 202 from damaging the working channel of the endoscope during insertion. Thus, in an insertion configuration, the pressure sensing device 206 is positioned within the needle 202 such that a position of the bunt distal end 222 is aligned with or protrudes slightly distally beyond the sharp distal tip 210 of the needle 202. Accordingly, in this embodiment, the pressure sensor 212 must be positioned along a distal portion 214 of a longitudinal body 220 of the pressure sensing device 206 such that, when the pressure sensing device 206 is in the insertion configuration relative to the needle 202, the pressure sensor 212 is covered by a portion of the needle 202. In other words, where the sharp distal tip 210 of the needle 202 is formed via a tapering at a distal end 216 of the needle 202, the pressure sensor 212 should be sufficiently distanced from the distal end 222 of the body 220 such that the pressure sensor 212 is fully covered by a portion of the needle 202 regardless of a rotational orientation of the pressure sensing device 206 within the needle 202.

The system 200 may be used in a manner substantially similar to the system 100. The needle 202, however, is inserted to the target area with the pressure sensing device 206 received therewithin in the insertion configuration, as shown in step 1. Once the needle 202 has reached the target area, the pressure sensing device 206 may be drawn proximally with respect to the needle 202 so that the sharp distal tip 210 of the needle 202 is exposed, as shown in step 2. The needle 202 is then advanced distally so that a wall 22 of the portal vein 20 is punctured via the sharp distal tip 210 and the needle 202 extends into an interior thereof, as shown in step 3. Upon gaining access to the interior of the portal vein 20, the pressure sensing device 206 is moved distally with respect to the needle 202 until the pressure sensor 212 is extends distally past the distal end 216 of the needle 202 to measure pressure within the portal vein 20, as shown in step 4.

Figure 5:
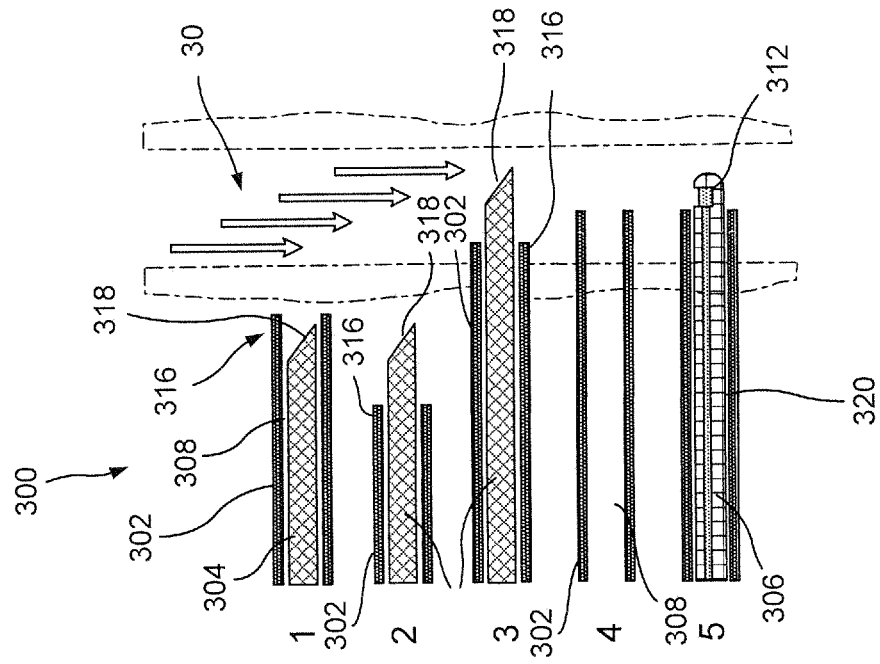
FIG. 5 shows a schematic view of a system according to yet another exemplary embodiment of the present disclosure.

As shown in FIG. 5, a system 300 according to another exemplary embodiment may be substantially similar to the system 100 described above, comprising a needle 302, a stylet 304 and a pressure sensing device 306. FIG. 5 shows steps 1-5 for gaining access into a portal vein 30 using the system 100. Similarly to the system 100, the needle 302 may be inserted through a working channel of an endoscope to a target area proximate a portal vein 30, with the stylet 304 received therein, in an insertion configuration. In this embodiment, however, the portal vein 30 is pierced via a sharp distal tip 318 of the stylet 304 rather than via the needle 302.

The needle 302 may be substantially similar to the needle 102 described above. A distal end 316 of the needle 302, however, does not need to include a sharp tip. The distal end 316 may, for example, include a distal face that extends substantially transverse to a longitudinal axis of the needle 302, as the needle 302 is not required for puncture the portal vein 30.

In this embodiment, the stylet 304 may be substantially similar to the stylet 104 described above with regard to the system 100. The stylet 304, however, includes a sharp distal tip 318. The sharp distal tip 318 may be formed in any of a number of configurations. In one example, the sharp distal tip 318 may be formed via a tapered distal-facing surface extending at a non-perpendicular angle with respect to a longitudinal axis of the stylet 304.

In the insertion configuration, the stylet 304 is received within a channel 308 of the needle 302 so that the distal tip 318 is aligned with the distal end 316 of the needle 302 or slightly proximal thereto, as shown in step 1. This prevents the sharp distal tip 318 of the stylet 304 from damaging the working channel of the endoscope while also preventing any inadvertent collection of tissue therewithin. Once the needle 302 and stylet 304 have reached the target are proximate the portal vein 30, however, the needle 302 is drawn proximally relative to the stylet 304 so that the sharp distal tip 318 of the stylet 304 is exposed in a piercing configuration, as shown in step 2. The needle 302 and stylet 304, in the piercing configuration, are moved distally until the sharp distal tip 318 of the stylet 302 penetrates the portal vein 30, as shown in step 3. After the stylet 304 has pierced the portal vein 30, the needle 302 is advanced distally over the stylet 304 to enter the portal vein 30. After the distal end 316 of the needle 302 has been positioned as desired within the portal vein 30, the stylet 304 may be removed, as shown in step 4 and, as shown in step 5, the pressure sensing device 306 may then be inserted through the needle 302 until a pressure sensor 312 mounted and/or positioned along a body 320 of the pressure sensing device 306 is exposed to the fluid flowing through the portal vein 30 to generate a portal pressure measurement.

Figure 6:
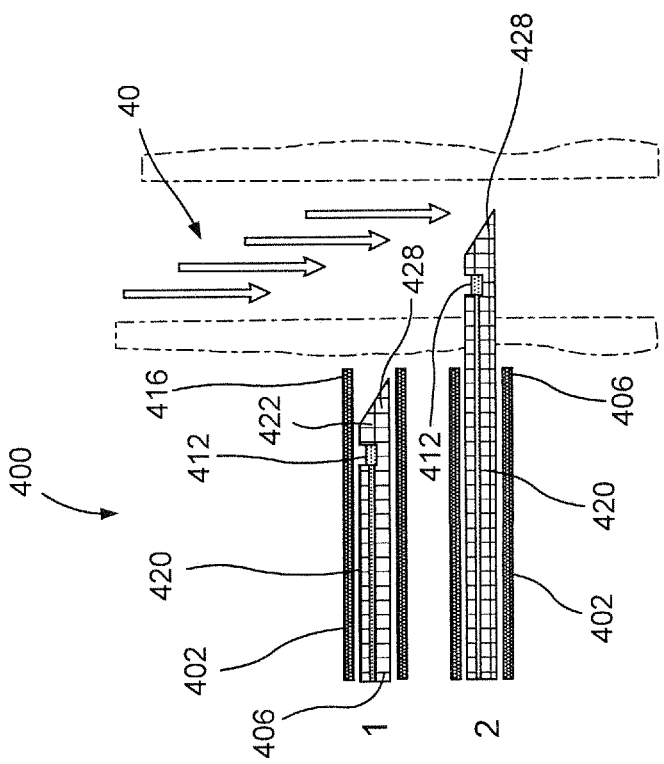
FIG. 6 shows a schematic view of a system according to another exemplary embodiment of the present disclosure.

As shown in FIG. 6, a system 400 may be substantially similar to the systems 200, 300 described above. Similarly to the system 200, the system 400 comprises a needle 402 and pressure sensing device 406, which may be used to access the portal vein 40, as shown in steps 1 and 2 of FIG. 6. Similarly to the system 200, the system 400 does not require a separate stylet as the needle 402 is inserted through a working channel of an endoscope to a target area proximate the portal vein 40 with the pressure sensing device 406 received therewithin in an insertion configuration. In this embodiment, however, the portal vein 40 is pierced via a sharp distal tip 422 of a pressure sensing device 406, rather than via a distal end 416 of the needle 402. Thus, the needle 402 is substantially similar to the needle 302, as described above with respect to the system 300, which does not include a sharp distal tip.

Figure 7:
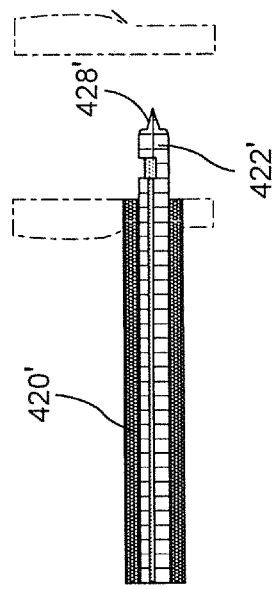
FIG. 7 shows a schematic view of the system of FIG. 6, including a pressure sensing device according to an alternate embodiment of the present disclosure
Figure 8:
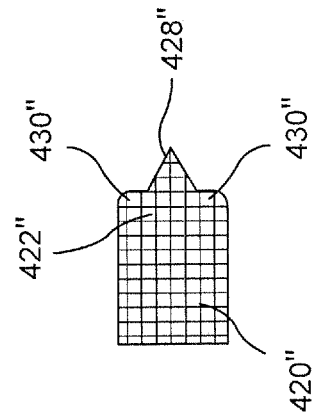
FIG. 8 shows a schematic view of the system of FIG. 6, including a pressure sensing device according to yet another alternate embodiment of the present disclosure.

The pressure sensing device 406 may be substantially similar to the pressure sensing devices 206 described above, comprising a longitudinally extending body 420 and a pressure sensor 412 positioned along a distal portion 414 thereof. Rather than a blunted distal end, however, a distal end 422 of the body 420 includes a sharp tip 428, which may be formed via a tapering of the distal end 422. The sharp tip 428 may have any of a number of configurations. In one example, the sharp tip 428 may be formed via a tapered distal-facing surface which extends at a non-perpendicular angle relative to a longitudinal axis of the body 420. In another example, as shown in FIG. 7, a distal end 422' of a body 420' of a pressure sensing device 406' may be substantially conically tapered to form a sharp tip 428'. In yet another example, as shown in FIG. 8, a distal end 422" of a body 420" may include blunted edges 430" with the sharp tip 428" extending distally therefrom. The sharp tip 428" may be substantially conically shaped. In both of the examples shown in FIGS. 7 and 8, the sharp tips 428', 428" are substantially centered relative to a longitudinal axis of the body 420', 420", respectively. Since the sharp tips 428', 428" are centered, a likelihood of the sharp tips 428', 428" damaging the working channel of the endoscope is reduced so that, if so desired, the pressure sensing devices including the sharp tips 428', 428" may be inserted directly through the working channel of an endoscope, without the use of the needle 402, to gain access to the portal vein.

As shown in FIGS. 9-11, a system 500 according to yet another exemplary embodiment of the present disclosure may be substantially similar to the systems 200, 400 described above, comprising a needle 502 and a pressure sensing device 506. The needle 502 and the pressure sensing device 506, however, include additional features which allow the needle 502 and the pressure sensing device 506 to interface with one another so that, when moved from an insertion configuration to a pressure sensing configuration, a distal end 522 of the pressure sensing device 506 moves distally beyond a distal end 516 of the needle 502 by a predetermined distance. It will be understood by those of skill in the art that this feature may be useful for measuring the pressure within a portal vein since the portal vein is quite small in comparison to other veins. Thus, the predetermined distance between the distal end 522 of the pressure sensing device 506 and the distal end 516 of the needle 502 in the pressure sensing configuration may be set so that, when the system is in the pressure sensing configuration in an operative position (i.e., in the portal vein), the distal end 522 of the pressure sensing device 506 does not contact and/or pierce a far wall of the portal vein into which it has been inserted preventing damage to the portal vein.

The needle 502 may be substantially similar to either of the needles 202 or 402, including a channel 508 through which the pressure sensing device 506 may be inserted. The pressure sensing device 506 may be substantially similar to either of the pressure sensing devices 206 or 406, including a body 520 with a pressure sensor (not shown) positioned along a distal portion thereof. A distal end of either the needle 502 or the body 520 may include a sharp tip for piercing the portal vein and gaining access thereto. To prevent the pressure sensing device 506 from moving beyond the predetermined distance relative to the needle 502, the body 520 includes fins 532 movable between a constrained configuration, in which the fins 532 are moved toward an exterior surface 534 of a body 520 of the pressure sensing device 506, and a outwardly biased configuration, in which the fins 532 are moved radially outward, away from the exterior surface 534 of the body 520. When the fins 532 are in the constrained configuration, the pressure sensing device 506 may be received within the channel 508 of the needle 502 so that the system 500 is in the insertion configuration. As the pressure sensing device 506 is moved distally relative to the needle 502 toward the pressure sensing configuration, the fins 532 revert to their outwardly biased configuration to engage a portion of the needle 502, thereby preventing further distal movement of the pressure sensing device 506 with respect to the needle 502.

The fins 532 may be constrained via an interior surface of the channel 508 of the needle 502, when in the insertion configuration. Upon moving the pressure sensing device 506 distally with respect to the needle 502, the fins 532 are freed to revert to their outwardly biased configuration to engage a distal portion of the needle 502 (e.g., a recess or groove along a distal portion of the interior surface of the channel 508), when in the pressure sensing configuration. In this embodiment, movement of the fins 532 may be controlled via one or more pull wires 536 so that, if it is desired to draw the pressure sensing device 506 back into the needle 502 toward the insertion configuration, the pull wire 536 may be drawn proximally relative to the pressure sensing device 506 so that the fins 532 are moved toward the constrained configuration, and the pressure sensing device 506 may be drawn back into the channel 508.

According to another example, as shown in FIGS. 12-13, a system 500' may be substantially similar to the system 500, comprising a needle 502' and a pressure sensing device 506' including features which interface so that a distal end 522' of the pressure sensing device 506' is moved distally beyond a distal end 516' of a needle 502' via a predetermined distance, when in a pressure sensing configuration. Similarly to the pressure sensing device 506, a body 520' of the pressure sensing device 506' includes fins 532' movable between a constrained configuration and an outwardly biased configuration, in which the fins 532' engage a corresponding portion of the needle 502' when in the pressure sensing configuration. The fins 532' in the embodiment, however, are not controllable via pull wires. Rather, the fins 532' are connected to the body 520' and configured so that, when it is desired to move the system 500' from the pressure sensing configuration to the insertion configuration, moving the pressure sensing device 506' proximally relative to the needle 502' causes the fins 532' to be constrained toward the constrained configuration so that the pressure sensing device 506' may be drawn into a channel 508' of the needle 502'.

For example, a proximal end 538' of the fins 532' may be connected to the body 520' so that a distal end 540' of the fins 532' are movable toward and away from an interior surface 534' of the body 520' in the insertion and pressure sensing configurations, respectively. The fins 532' may be configured to engage a correspondingly sized and shaped groove 542' along a distal portion of the channel 508' in the pressure sensing configuration. The groove 542' may include, for example, an angled surface 544' extending proximally therefrom so that, when the fins 532' are slid proximally against the angled surface 544', the fins 532' are moved toward the constrained configuration so that the pressure sensing device 506' may be drawn proximally into the channel 508' of the needle 502'.

As shown in FIGS. 14-15, a system 500" may be substantially similar to the systems 500, 500' described above, comprising a needle 502" and a pressure sensing device 506" including a body 520" with fins 532" for allowing a distal end 522" of the pressure sensing device 506" to move distally beyond a distal end 516" of the needle 502" via a predetermined distance. The fins 532" in this embodiment, however, are not movable. Rather, the system 500" is configured so that a distal end 540" of the fins 532" abuts against a radially inwardly extending protrusion 542" of a channel 508" of the needle" preventing any further distal motion of the pressure sensing device 506" relative to the needle 502". Thus, the radially inwardly extending protrusion 542" of the needle 502" acts as a stop preventing movement of the fins 532" of the pressure sensing device 506" distally therebeyond.

Although the systems 500 (along with systems 500' and 500") specifically show and describe fins 532 for controlling a distance via which the distal end 522 of the body 520 of the pressure sensing device 506 extends distally from the distal end 516 of the needle 502, it will be understood by those of skill in the art that the above-described systems may include in any of a variety of other features for controlling the distance via which the distal end 522 of the pressure sensor 506 extends beyond the distal end 516 of the needle. For example, a handle member of the system 500 may include features (e.g., a spring loaded slider, a slider with twisting lock, button) which causes the distal end 522 of the pressure sensing device 506 to protrude from the needle 502 via a predetermined distance.

As shown in FIG. 16, a system 600 according to another exemplary embodiment comprises a pressure sensing device 606 which, similarly to the pressure sensing devices described above, includes a longitudinally extending body 620 with a pressure sensor 612 positioned along a distal portion 614 thereof. The pressure sensing device 606, however, further includes a retractable needle knife 646 longitudinally movably housed within the body 620 for cutting a small hole through a wall 62 of the portal vein 60 to gain access thereinto. Since the pressure sensing device 606 in this embodiment includes the needle knife 646 for gaining access to the portal vein 60, a separate needle and/or stylet is not required.

The pressure sensing device 606 may include a lumen 650 extending longitudinally though the body 620, within which the needle knife 646 is slidably received. The needle knife 646 may be movable between an insertion configuration, in which a distal end 648 of the needle knife 646 does not extend distally beyond a distal end 622 of the body 620 of the pressure sensing device 606, to a cutting configuration, in which the needle knife 646 is moved distally with respect to the body 620 so that the distal end 648 of the needle knife 646 extends distally beyond the distal end 622 of the body 620 to cut a small hole though the wall 62 of the portal vein 60. In one embodiment, the distal end 648 of the needle knife 646 may be sharp enough to create a small hole through the vein, through which the body 620 of the pressure sensing device 606 may be inserted. In another embodiment, the needle knife 646 may utilize hot cautery to create a small hole through the wall 62 of the portal vein 60. The needle knife 646 may be able to create a smaller hole in the wall 62 of the portal vein than one formed via a conventional needle, which may be advantageous depending on the level of disease the patient is experiencing.

FIG. 16 shows steps 1-4 for gaining access to a portal vein 60 using the pressure sensing device 606. The pressure sensing device 606 may be inserted directly through a working channel of an endoscope to a target area within a patient body, with the needle knife 646 housed within the body 620, in the insertion configuration. As shown in step 1, a distal end 622 of a body 620 of the pressure sensing device is positioned proximate a wall 62 of a portal vein 60 in a target position. Once the pressure sensing device 506 is in the target position, the needle knife 646 is moved from the insertion configuration to the cutting configuration, as shown in step 2. The distal end 648 of the needle knife 646 may then be used to a form a small hole in the wall 62 of the portal vein 60, through which the distal end 622 of the body 620 may follow through, as shown in step 3. As shown in step 4, the body 620 is inserted through the small hole until the pressure sensor 612 is exposed to a flow of blood through the portal vein 60. Once the portal vein 60 has been accessed by the body 620, the needle knife 646 is retracted into the body toward the insertion configuration to prevent damage to the portal vein 60 as the pressure reading is being taken.

Although the pressure sensing device 600 is shown and described as being inserted directing through the working channel of the endoscope to gain access to the portal vein 60, it will be understood by those of skill in the art that the pressure sensing device 606 may also be utilized with a needle, substantially as described above with respect to the systems 200, 400. Inserting the pressure sensing device 606 with a needle may be particularly useful where there is concern regarding accessing the portal vein through the stomach or duodenum. The needle knife 646 may be used to access the vein once the needle is in the liver, reducing potential bleeding.

As shown in FIGS. 17-18, a pressure sensing device 706 according to another exemplary embodiment may be utilized in any of the systems 100-500, as described above. The pressure sensing device 706 may be substantially similar to the pressure sensing devices 106-506 including a longitudinally extending body 720 including a pressure sensor 712 positioned along a distal portion 714 of the body 720 and connected to a proximal portion of the pressure sensing device 706 via a connection cable 724 (e.g., electrical, optical fiber) extending proximally from the pressure sensor 712 along a length of the body 720. The pressure sensing device 706, however, further includes a working channel 752 extending through the body 720 so that other diagnostic and/or therapeutic tools may be inserted through the working channel 752 into the portal vein. The working channel 752 may extend along an axis substantially parallel to a central longitudinal axis of the body 720.

The pressure sensor 712 may also be offset from the central longitudinal axis of the body 720 so that the connection cable 724 extends substantially parallel to the central longitudinal axis of the body 720. In one embodiment, the pressure sensor 712 may have a distal-facing diaphragm 713 and/or reading surface such that the pressure sensor is mounted within a distal end 722 of the body 720 so that the distal-facing diaphragm is substantially flush with the distal end 722. The pressure sensing device 706 may be used in substantially the same manner as described above with respect to the systems 100-500 (e.g., inserted through a channel of a needle) to gain access to portal vein and take a pressure measurement thereof.

According to an alternate embodiment, as shown in FIGS. 19-20, a pressure sensing device 706' may be substantially similar to the pressure sensing device 706, comprising a longitudinal body 720' including a pressure sensor 712' connected to a proximal end of the device 706' via a connection cable 724' along with a working channel 752' extending longitudinally through the body 720'. The pressure sensor 712', however, may be mounted within a recess 726' extending laterally through a distal portion 714' of the body 720', similarly to the pressure sensor 112 shown and described with respect to FIG. 2. Since the pressure sensor 712', in this embodiment, is distanced from a distal end 722' of the body 720', the distal end 722' may be blunt (as shown) or, alternatively, may include a sharp tip for piercing the portal vein. Similarly to the pressure sensing device 706, the pressure sensing device 706' may be used in a manner substantially similar to the portal veins 106-506, as described above with respect to the systems 100-500.

Figure 21:
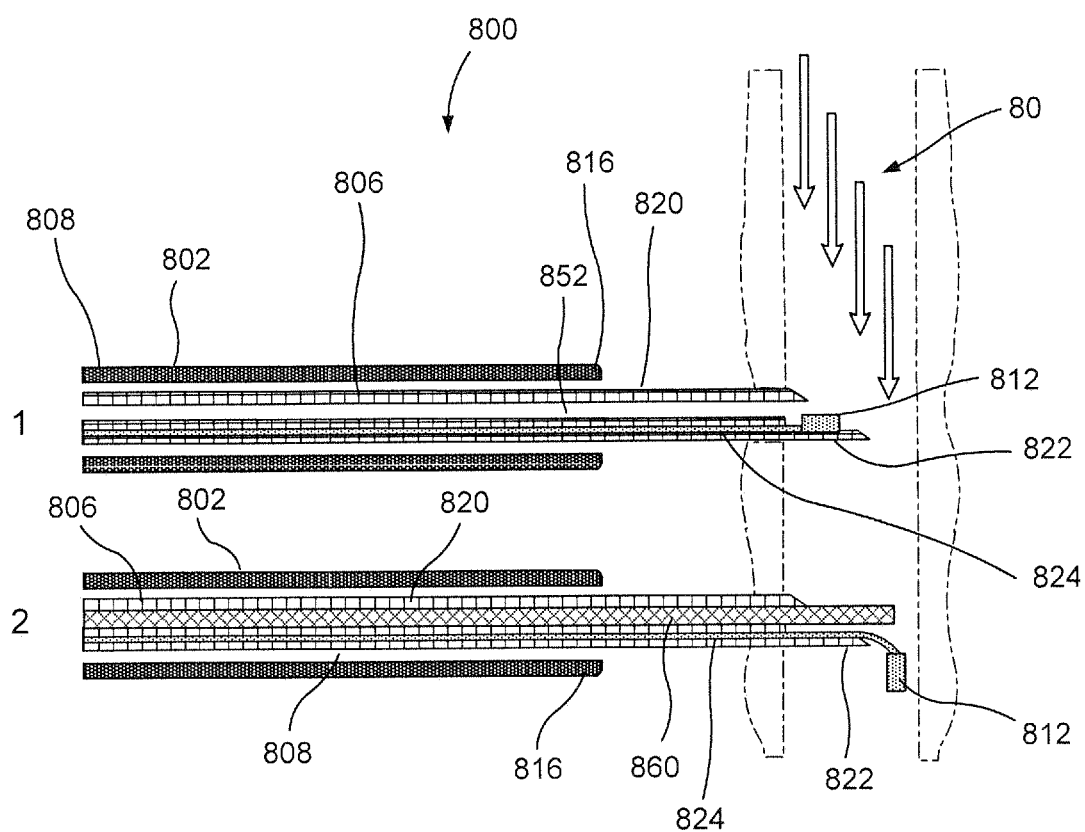
FIG. 21 shows a schematic view of a system according to yet another exemplary embodiment of the present disclosure.

As shown in FIG. 21, a system 800 may be substantially similar to the systems (e.g., systems 200, 400) described above, comprising a needle 802 and a pressure sensing device 806, which may be substantially similar to the pressure sensing device 706. FIG. 21 shows steps 1 and 2 for measuring a pressure within and/or providing treatment to a portal vein in which the pressure sensing device 806 is inserted. The needle 802 may be substantially similar to the needles 202, 402, including a longitudinal channel 808 through which the pressure sensing device 806 may be slidably received. The pressure sensing device 806 may be substantially similar to the pressure sensing device 706 including a working channel 852 extending through a longitudinally extending body 820 of the pressure sensing device 806 for the passage of another tool 860 such as, for example, a diagnostic and/or therapeutic tool. A pressure sensor 812, however, is not fixed within or along the body 820. Rather, the pressure sensor 812 is movably housed within the body 820 between a first configuration (step 1), in which the pressure sensor 812 is received within a distal end 822 of the body 820, and a second configuration (step 2), in which the pressure sensor 812 is moved distally out of the distal end 822 so that the pressure sensor 812, which is connected to a proximal end of the pressure sensor device via a connection cable 824, is moved laterally away from the distal end 822 as it extends distally thereoutof. Although the distal end 822 of the body 820 is shown as including a sharp tip while a distal end 816 of the needle 802 is shown as being blunted, it will be understood by those of skill in the art that, as described earlier with respect to systems 200 and 400, either the needle 802 or the pressure sensing device 806 may include the sharp tip for piercing the wall of the portal vein to gain access thereinto.

In the first configuration, a portion of the pressure sensor 812 partially occludes a distal opening 854 of the working channel 852. In one embodiment, when it is desired to insert the additional tool 860 through the working channel 852, a physician or other user may control the movement of the pressure sensor 812 from the first configuration to the second configuration via a mechanism coupled to a handle portion of the pressure sensing device 806 such as, for example, a pull wire or spring loaded mechanism connected to the connecting cable 824. Alternatively, the pressure sensor 812 may automatically move from the first configuration toward the second configuration (and vice versa) via a mechanical switch or sensor which extends along the working channel 852 so that, when the additional tool 860 is moved distally through the working channel 852, the mechanical switch or sensor is triggered to move the pressure sensor 812, via a distal movement of the connection cable 824 relative to the body 820, distally beyond the distal end 822, toward the second configuration. In the second configuration, the pressure sensor 812 is moved distally past the distal end 822 of the body 820 to extend laterally relative to a longitudinal axis of the pressure sensing device 806. In other words, as the pressure sensor 812 is moved distally past the distal end 822, the connection cable 824 bends so that the pressure sensor 812 falls away from the longitudinal axis of the pressure sensing device 806 to provide a clear path for the additional tool 860 to enter the portal vein. In one embodiment, the connection cable 824 may include shape memory characteristics so that, the connection cable 824 bends toward a predetermined configuration, when the pressure sensor 812 is pushed out of the body 820.

Upon removal of the additional tool 860 from the working channel 852, the pressure sensor 812 may be manually drawn back into the body 820 toward the first configuration or, alternatively, may be drawn back into the body 820 automatically via a mechanical switch or sensor that is triggered as the additional tool 860 is moved proximally through the working channel 852.

As shown in FIGS. 22-25, a system 900 according to another exemplary embodiment of the present disclosure may be substantially similar to the system 800, comprising a needle 902 and a pressure sensing device 906. As described above, a portal vein may be pierced via one of the needle 902 and the pressure sensing device 906 so that a pressure of the portal vein may be measured via a sensor 912 of the pressure sensing device 906, which is inserted into the portal vein. The pressure sensing device 906 may be substantially similar to the pressure sensing device 806, including a body 920 having a working channel 952 extending longitudinally therethrough to allow an additional tool 960 to be inserted therethrough to access the portal vein. Similarly to the pressure sensing device 806, in a first configuration, the pressure sensor 912 occludes a portion of a distal opening 954 of the working channel 952 so that, the pressure sensor 912 must be moved toward a second configuration to permits passage of the additional tool 960 through the working channel 952 and into the portal vein. Rather than being moved distally past a distal end 922 of the body 920, however, in the second configuration, the pressure sensor 912 is moved into correspondingly sized, shaped and positioned cavity 956 formed along an interior surface of the body 920.

Figure 22:
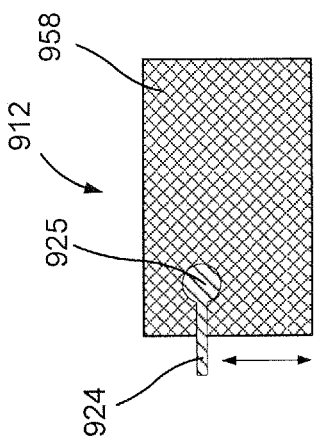
FIG. 22 shows a longitudinal side view of a system according to another exemplary embodiment of the present disclosure, in a first configuration.
Figure 23:
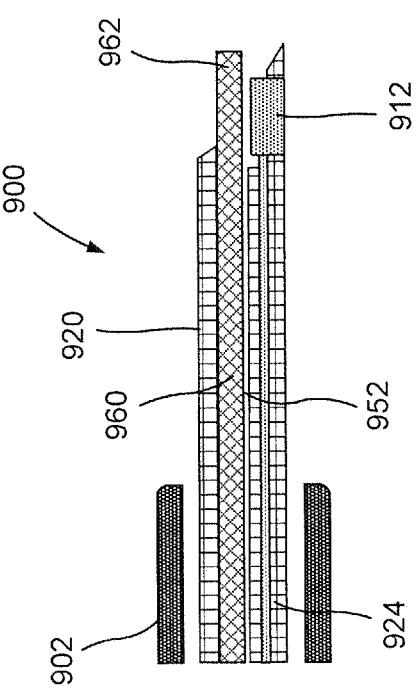
FIG. 23 shows a longitudinal side view of the system of FIG. 22, in a second configuration.

In particular, as shown in FIGS. 22-23, the pressure sensing device 906 is comprised of the longitudinally extending body 920 through which the working channel 952 extends, substantially parallel to a central longitudinal axis of the body 920. The pressure sensor 912 is positioned at the distal end 922 of the body 920 and is connected to a proximal portion of the pressure sensing device 906 via a connection cable 924 extending longitudinally through the body 920. The connection cable 924 may also extend substantially parallel to the central longitudinal axis of the body 920. The connection cable 924 and the pressure sensor 912 are in a longitudinally fixed position with respect to the body 920. However, the pressure sensor 912 is laterally movable with respect to the central longitudinal axis of the body 920. Specifically, the body 920 includes a cavity 956 that is sized and shaped to correspond with the pressure sensor 912. The cavity 956 is axially aligned with the pressure sensor 912 so that, when the pressure sensor 912 is moved toward the second configuration, the pressure sensor 912 drops into and/or is pushed into the cavity 956 to provide a clear path via which the additional tool 960 may be inserted into the portal vein via the working channel 952.

Figure 24:
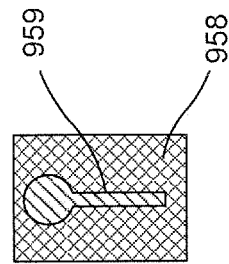
FIG. 24 shows an enlarged side view of a sensor of the system of FIG. 22.
Figure 25:
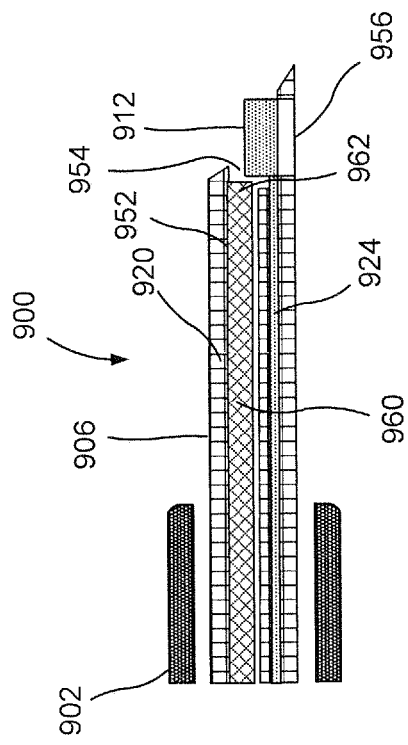
FIG. 25 shows an enlarged end view of the sensor of FIG. 24.

In one embodiment, the pressure sensor 912 may include a housing or casing 958 that is movably connected to the connection cable 924. The housing 958 may be slid laterally relative to the connection cable 924 between the first configuration and the second configuration. In particular, the housing 958 may include a slot or track 959, as shown in FIG. 25, within which a distal end 925 of the connection cable 924 may slid to permit movement of the pressure sensor 912 between the first and second configuration, as shown in FIG. 24. The distal end 925 may include an enlarged end received within the track 959 to prevent the connection cable 924 from being inadvertently disconnected from housing 958.

In an embodiment, the pressure sensor 912 may be biased toward the first configuration. When the additional tool 960 is inserted distally through the working channel 952 of the body 920, a distal end 962 of the additional tool 960 may be pushed against a rounded edge of the housing 958, which pushes the pressure sensor 912 into the cavity 956 toward the second configuration so that the additional tool 960 may be moved distally therepast into the portal vein. Upon removal of the additional tool 960, the pressure sensor 912 may revert to its biased first configuration.

As discussed above with respect to the systems 100-900, pressure sensing devices may be guided to the portal vein under EUS guidance. In some cases, the portal sensing devices described above may also include an additional sensor for enabling magnetically driven tracking and/or mapping. This feature may be particularly useful where the pressure measuring device 606 is used without ultrasound, or for training purposes to spatially verify the location of the wire in the anatomy during an EUS procedure. Alternatively or in addition, a magnetically driven or fiber optic 3D shaping sensor could be added as an additional control to track the sharp tip of the pressure sensing device, needle, or stylet used to gain access to the portal vein during the procedure. Information provided to the user (e.g., physician) may be used as safety feedback to ensure that an opposite side of the vein (i.e., a far wall of the vein) is not inadvertently punctured.

It will be apparent to those skilled in the art that various modifications may be made in the present disclosure, without departing from the scope of the disclosure.

What is claimed is:

1. A system for measuring a pressure in a vein, comprising:
   a needle sized and shaped to be inserted through a working channel of an endoscope, the needle extending longitudinally and including a channel extending longitudinally therethrough; and
   a pressure sensing device including a longitudinally extending body sized and shaped to be slidably inserted through the channel of the needle and a sensor mounted on a distal portion of the body and connected to a proximal portion of the pressure sensing device via a connection cable, the sensor configured to detect information corresponding to a pressure of a flow of blood through a vein,
   wherein the pressure sensing device is longitudinally movable relative to the needle between an insertion configuration, in which the sensor is covered via a portion of the needle, and a pressure sensing configuration, in which a distal end of the body of the pressure sensing device extends distally past a distal end of the needle to expose the sensor to a flow of fluid within the vein and
   wherein the distal end of the body includes fins configured to engage an engaging feature of the needle to define a maximum distance by which the body can be extended out of the distal end of the needle in the pressure sensing configuration.

2. The system of claim 1, further comprising a stylet sized and shaped to be inserted through the channel of the needle, the stylet being longitudinally movable relative to the needle between an insertion configuration and a piercing configuration.

3. The system of claim 1, wherein the sensor is mounted within a recess extending laterally into the body of the pressure sensing device along the distal portion thereof.

4. The system of claim 1, wherein the body of the pressure sensing device includes a through hole extending laterally through the distal portion of the body so that a distal face of the sensor is exposed to a flow of fluid passing through the through hole.

5. The system of claim 1, wherein, when in the pressure sensing configuration, the distal end of the body is configured to move distally past the distal end of the needle by a predetermined distance, and the fins are configured to engage a portion of the needle preventing the body from being drawn proximally into the needle.

6. The system of claim 1, wherein the pressure sensor is attached to the pressure sensing device via the connection cable so that when the pressure sensing device is in the pressure sensing configuration, the pressure sensor is configured to move distally past the distal end of the body.

7. The system of claim 6, wherein the pressure sensor is configured to fall away from a longitudinal axis of the pressure sensing device when in the pressure sensing configuration.

8. The system of claim 1, wherein the fins are configured so that, when the body is moved a predetermined distance distally past the distal end of the needle, the fins move from a first configuration, in which the fins are constrained toward an exterior surface of the body to a second configuration in which the fins are moved radially outward to engage a portion of the needle.

9. The system of claim 8, wherein the needle includes an engaging feature configured to engage the fins when the fins are in the second configuration, a position of the engaging feature being selected to ensure that the body is not extended distally out of the needle beyond the predetermined distance.

10. The system of claim 9, wherein the engaging feature is one of a recess and a groove formed in the needle.

11. The system of claim 8, wherein the fins are movable from the second configuration to the first configuration via a pull wire connected to the fins.

12. The system of claim 8, wherein an interior of the needle is configured to interact with the fins so that the fins are movable from the second configuration to the first configuration as the body is withdrawn proximally into the needle.

13. The system of claim 12, wherein an interior surface of the needle includes an angled surface at a distal end thereof configured to move the fins from the second configuration to the first configuration as the body is withdrawn proximally into the needle.

14. The system of claim 1, wherein the needle is flexible.

15. The system of claim 1, wherein the connection cable extends proximally from the sensor through a length of the body.

16. The system of claim 1, wherein the fins comprise two fins, one on each side of the body of the pressure sensing device.

17. The system of claim 1, wherein the fins are on an outer surface of the body of the pressure sensing device and the engaging feature is on an inner surface of the channel of the needle.

* * * * *